(12) United States Patent
Saito et al.

(10) Patent No.: US 6,649,685 B2
(45) Date of Patent: *Nov. 18, 2003

(54) LONG FIBER-REINFORCED POLYPROPYLENE RESIN COMPOSITION AND MOLDED ARTICLE

(75) Inventors: Koichi Saito, Ichihara (JP); Toshimori Nakai, Ichihara (JP); Nobukazu Atsumi, Ichihara (JP); Hideshi Ishiwa, Ichihara (JP)

(73) Assignees: Chisso Corporation, Osaka (JP); Chisso Petrochemical Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/974,605

(22) Filed: Oct. 9, 2001

(65) Prior Publication Data

US 2002/0115779 A1 Aug. 22, 2002

(30) Foreign Application Priority Data

Nov. 29, 2000 (JP) .......................................... 2000-365458
Jul. 25, 2001 (JP) .......................................... 2001-224801

(51) Int. Cl.$^7$ ............................. C08K 3/40; C08L 51/06
(52) U.S. Cl. ....................... 524/494; 524/847; 524/504; 525/64
(58) Field of Search ................................. 524/494, 493, 524/847, 504; 525/64

(56) References Cited

U.S. PATENT DOCUMENTS

| | | | | |
|---|---|---|---|---|
| 5,548,013 A | * | 8/1996 | Fujii et al. | |
| 6,268,062 B1 | * | 7/2001 | DeMeuse | 428/461 |
| 6,284,831 B1 | * | 9/2001 | Shimpuku et al. | 524/494 |
| 6,323,298 B1 | * | 11/2001 | Yanagihara et al. | 526/351 |

* cited by examiner

Primary Examiner—Tae H. Yoon
(74) Attorney, Agent, or Firm—J.C. Patents

(57) ABSTRACT

Provided are a long fiber-reinforced polypropylene resin composition which provides a molded article excellent in a mechanical strength and an impact resistance and having a small anisotropy in a strength, so that it can suitably be used even for uses in medium-sized to large-sized molded articles, and a molded article obtained from the same. The long fiber-reinforced polypropylene resin composition comprises 35 to 75% by weight of a matrix polymer comprising a modified propylene homopolymer (A1) which is prepared by modifying a propylene homopolymer with an unsaturated carboxylic acid or a derivative thereof and which has an isotactic pentad ratio (P value) of 96% or more, a melt flow rate (230° C., 21.18N) of 80 g/10 min or more and an Mw/Mn (Q value) of 3.5 or less and 25 to 65% by weight of a glass long fiber (A2) having a length of 2 to 50 mm.

4 Claims, No Drawings

LONG FIBER-REINFORCED POLYPROPYLENE RESIN COMPOSITION AND MOLDED ARTICLE

TECHNICAL FIELD

The present invention relates to a long fiber-reinforced polypropylene resin composition which is suited for producing not only small-sized molded articles but also wide-ranged molded articles extending from medium-sized ones to large-sized ones and to a molded article obtained from the same. Specifically, it relates to a molded article which is excellent in a mechanical strength, particularly a mechanical strength in a direction perpendicular to a flow direction of the resin obtained especially when it is molded into a medium-sized to large-sized molded article and therefore has a small anisotropy in a mechanical strength and which is excellent as well in an impact strength and to a long fiber-reinforced polypropylene resin composition which provides the same.

BACKGROUND ART

A so-called long fiber-reinforced polypropylene resin composition obtained by impregnating a reinforcing continuous fiber bundle with a molten polypropylene resin and then pultruding it to pelletize to a length of 2 to 50 mm provides a molded article which is excellent in a mechanical strength and an impact resistance and therefore is widely used for uses in car parts, industrial parts and the like.

However, when molding a long fiber-reinforced polypropylene resin composition into medium-sized to large-sized molded articles, the mechanical strength is still unsatisfactory, and particularly the mechanical strength in a direction perpendicular to a flow direction of the resin is short. Accordingly, the molded articles have a large anisotropy in a strength, and it is the existing state that the uses thereof are restricted.

Proposed in U.S. Pat. No. 2,883,369 official gazette (Japanese Patent Application Laid-Open No. 121146/1991) as a long fiber-reinforced resin composition which is improved in a mechanical strength and an impact resistance is a long fiber-reinforced polypropylene resin composition prepared by feeding a molten mixture of a resin component comprising 98 to 50 parts by weight of a polyolefin (A) and 2 to 50 parts by weight of a modified olefin base polymer (B) modified by graft-polymerizing an olefin base polymer comprising propylene as a principal polymer structural unit with maleic anhydride from an extruding machine to a crosshead die to impregnate reinforcing continuous fibers with it. Further, it is described in the above official gazette that capable of being employed as another impregnating method is a method in which a mixture prepared by melting and kneading the polyolefin (A) and an unsaturated carboxylic acid or a derivative thereof together with an organic peroxide is used to impregnate fibers therewith and in which a part of the polyolefin (A) is reacted with an unsaturated carboxylic acid or a derivative thereof to synthesize the modified olefin base polymer (B), whereby the desired resin composition is prepared. However, investigations made by the present inventors have resulted in finding that when the composition described above is molded into a small-sized molded article, the molded article is improved in a mechanical strength and an impact strength, but when it is molded into medium-sized to large-sized molded articles, the mechanical strength and the impact strength, particularly the mechanical strength in a direction perpendicular to a flow direction of the resin are still unsatisfactory as compared with those of conventional ones.

As described above, not yet known is a long fiber-reinforced polypropylene resin composition providing a molded article which is excellent in a mechanical strength and an impact resistance even when it is molded into medium-sized to large-sized molded articles and which is improved particularly in a mechanical strength in a direction perpendicular to a flow direction of the resin and therefore has a small anisotropy in a strength. Thus, such composition has been demanded.

DISCLOSURE OF THE INVENTION

An object of the present invention is to provide a long fiber-reinforced polypropylene resin composition which can solve entirely the inconveniences described above, that is, an anisotropy in a mechanical strength, an impact resistance and a strength even when it is molded into medium-sized to large-sized molded articles and which can suitably be used as well for uses in medium-sized to large-sized molded articles. Another object is to provide a molded article obtained from the same.

Intensive investigations have been repeated by the present inventors in order to obtain a long fiber-reinforced polypropylene resin composition which can solve the inconveniences described above. As a result thereof, they have found that very useful for solving the problems described above is a long fiber-reinforced polypropylene resin composition in which a matrix polymer comprises a modified propylene homopolymer having a specific isotactic pentad ratio, a specific melt flow rate and a specific Mw/Mn (Q value) in the whole amount, and they have completed the present invention based on this finding.

That is, the present invention comprises structures shown below.

(1) A long fiber-reinforced polypropylene resin composition (A) comprising 35 to 75% by weight of a matrix polymer comprising a modified propylene homopolymer (A1) which is prepared by modifying a propylene homopolymer with an unsaturated carboxylic acid or a derivative thereof and which has an isotactic pentad ratio (P value) of 96% or more, a melt flow rate (230° C., 21.18N) of 80 g/10 min or more and an Mw/Mn (Q value) of 3.5 or less and 25 to 65% by weight of a glass long fiber (A2) having a length of 2 to 50 mm.

(2) A long fiber-reinforced polypropylene resin composition prepared by compounding the long fiber-reinforced polypropylene resin composition (A) as described in the above item (1) and a propylene homopolymer and/or propylene base block copolymer (B).

(3) A molded article obtained by molding the long fiber-reinforced polypropylene resin composition (A) as described in any of the above items (1) to (2).

EMBODIMENT OF THE INVENTION

The propylene homopolymer (A1) modified with an unsaturated carboxylic acid or a derivative thereof which is the matrix polymer constituting the long fiber-reinforced polypropylene resin composition (A) of the present invention, a so-called modified propylene homopolymer has to have an isotactic pentad ratio of 96% or more, a melt flow rate (230° C., 21.18N; hereinafter abbreviated as MFR) of 80 g/10 min or more and a weight average molecular weight/number average molecular weight (Mw/Mn ; so-called Q value) of 3.5 or less.

In this case, the isotactic pentad ratio shows an isotactic pentad ratio in terms of a pentad unit in a molecular chain and can be determined by means of a $^{13}$C-NMR based on Macromolecules 8 687 (1975). The respective average molecular weights in Mw and Mn can be determined by means of GPC (gel permeation chromatography).

A production process for the above modified propylene homopolymer includes a process in which 100 parts by weight of a propylene homopolymer having an isotactic pentad ratio of 96% or more is molten and kneaded with 0.1 to 5 parts by weight of an unsaturated carboxylic acid or a derivative thereof and 0.01 to 0.5 part by weight of an organic peroxide. A blending amount of the organic peroxide has to be suitably controlled so that the MFR and the Q value fall in the ranges described above.

In addition thereto, any of the following processes may be used as long as the isotactic pentad ratio, the MFR and the Q value fall finally in the ranges of the present invention.
(1) Molten and kneaded are 100 parts by weight of a propylene homopolymer having an isotactic pentad ratio of 96% or more, an MFR of 80 g/10 min or more and a Q value of 3.5 or less and 1 to 10 parts by weight of a commercial modified propylene polymer into which 1 to 10% by weight of an unsaturated carboxylic acid or an anhydride thereof is introduced.
(2) Molten and kneaded are 100 parts by weight of a propylene homopolymer having an isotactic pentad ratio of 96% or more, 1 to 10 parts by weight of a commercial modified propylene polymer into which 1 to 10% by weight of an unsaturated carboxylic acid or an anhydride thereof is introduced and 0.01 to 0.5 part by weight of an organic peroxide.
(3) Molten and kneaded are 100 parts by weight of a commercial modified propylene polymer into which 0.1 to 5% by weight of an unsaturated carboxylic acid or an anhydride thereof is introduced and which has an isotactic pentad ratio of 96% or more and 0.01 to 0.5 part by weight of an organic peroxide.

A production process for the propylene homopolymer having an isotactic pentad ratio of 96% or more shall not specifically be restricted, and any of publicly known processes can be adopted. A process disclosed in Japanese Patent Application Laid-Open No. 104907/1983 can be given as one example thereof. That is, the above propylene homopolymer can be obtained by polymerizing propylene at one or more steps in the presence of a catalyst in which a solid product (III) obtained by reacting an electron donor and an electron acceptor (for example, anhydrous aluminum chloride, titanium tetrachloride and vanadium tetrachloride) with a solid product (II) obtained by reacting titanium tetrachloride with an organic aluminum compound (I) (for example, triethylaluminum and diethylaluminum monochloride) or a reaction product (V) of the organic aluminum compound (I) with an electron donor (for example, diisoamyl ether and ethylene glycol monomethyl ether) is combined with the organic aluminum compound (I) and an aromatic carboxylic acid ester (IV) (for example, ethyl benzoate, methyl p-toluate, ethyl p-toluate and 2-ethylhexyl p-toluate) and in which a mole ratio IV/III of the above aromatic carboxylic acid ester (IV) to the above solid product (III) is set to 0.1 to 10.0. In this case, one step means one division for feeding continuously or temporarily these monomers.

The unsaturated carboxylic acid or anhydride thereof described above includes acrylic acid, methacrylic acid, maleic acid, nadic acid, fumaric acid, itaconic acid, maleic anhydride, nadic anhydride and itaconic anhydride, and maleic anhydride is preferred from a viewpoint of a glass fiber-reinforcing effect.

The matrix polymer in the long fiber-reinforced polypropylene resin composition of the present invention is preferably the modified propylene homopolymer described above in the whole amount from a viewpoint of an effect for improving the mechanical strength and the impact strength. However, master batch components such as an antioxidant, a light stabilizer, a UV absorber and an antistatic agent shall not specifically be excluded from being blended in small amounts.

In the present invention, the modified propylene homopolymer (A1) may be produced in advance prior to production of the long fiber-reinforced polypropylene resin composition (A) described later or may be produced in a melting and kneading step of the matrix polymer in producing the long fiber-reinforced polypropylene resin composition (A).

A continuous glass fiber bundle is used as a raw material for the glass long fiber (A2) described above having a length of 2 to 50 mm constituting the long fiber-reinforced polypropylene resin composition of the present invention, and this is commercially available in the form of a glass roving. Usually, it has an average fiber diameter of 4 to 30 μm, a filament focusing number of 400 to 10,000 filaments and a tex yarn number count of 300 to 20,000 g/km, and it has preferably an average fiber diameter of 9 to 23 μm and a filament focusing number of 1,000 to 6,000 filaments. From a viewpoint of a reinforcing effect, the surface thereof is subjected preferably to silane coupling agent treatment for providing it with a surface adhesive property to the resin.

Any of processes publicly known as a pultrusion process can be adopted as a production process for the long fiber-reinforced propylene resin composition of (A). Usually, employed is a process in which a molten resin of (A1) is fed from an extruding machine into an impregnating dice provided at a tip of the extruding machine and the continuous glass fiber bundle which is a raw material for (A2) is passed therethrough to impregnate the above glass fiber bundle with the molten resin and in which it is then pultruded through a nozzle and pelletized into a length of 2 to 50 mm. As described above, capable of being taken is a process in which the propylene homopolymer, the unsaturated carboxylic acid or anhydride thereof and the organic peroxide are dry-blended and thrown into a hopper of an extruding machine to be fed while carrying out modification at the same time.

Any of publicly known methods can be adopted as the impregnating method as long as they are methods by which a good impregnating property is obtained. Capable of being employed is any of a method in which a glass fiber bundle is brought into contact with a surface of a spreader and passed thereon while applying tension to thereby impregnate it with a molten resin (Japanese Patent Publication No. 37694/1988) and a method in which a glass fiber bundle is passed between a pair of opening pins provided in an impregnating dice in a non-contact state to thereby impregnate it with a molten resin (International Publication WO97/19805). The latter is a preferred method from a viewpoint of providing less problem on fluffing of a glass fiber bundle after passing nozzle at a high speed.

A content of the glass fiber (A2) is 25 to 65% by weight, preferably 35 to 55% by weight based on (A) from a viewpoint of an effect for improving the mechanical strength and the impact resistance.

The long fiber-reinforced propylene resin composition of (A) can be used for molding as it is or after diluted with the other propylene homopolymer and/or propylene base block copolymer (B) containing no glass long fibers.

Used as the diluent of (B) in addition to the propylene homopolymer are crystalline propylene base block copolymer resins of propylene with other a-olefins such as ethylene, 1-butene and 1-pentene having a propylene content of 70% by weight or more. The resins having an isotactic pentad ratio of 96% or more are preferably used as is the case with the modified propylene homopolymer (A1). The form thereof may be pelletal, granular, flaky or powdery and shall not specifically be restricted, and the pelletal form is preferably used.

The long fiber-reinforced propylene resin composition of (A) can be blended with the diluent (B) by a dry blending system. It is rather preferred that they are fed directly into a molding machine such as an injection-molding machine after dry-blending without passing through an extruding machine in order to maintain a length of the fibers contained in the composition and obtain a higher effect for improving the mechanical strength and the impact resistance. A blending proportion of the diluent (B) is determined depending on a glass fiber content in the long fiber-reinforced propylene resin composition (A) and a glass fiber content required to the finished molded article, and from a viewpoint of an effect for improving the mechanical strength and the impact resistance, it is 20 to 85% by weight, preferably 30 to 75% by weight based on the long fiber-reinforced propylene resin composition prepared by blending the long fiber-reinforced propylene resin composition (A) with the diluent (B). Further, in addition to (B), an antioxidant, a light stabilizer, a UV absorber and an antistatic agent can be added, if necessary.

Publicly known molding methods such as an injection-molding method, an extrusion-molding method, a blow-molding method, a compression-molding method and an injection compression-molding method can be applied to a production method for a molded article obtained from the long fiber-reinforced polypropylene resin composition or blended composition of the present invention, that is, a molding method without any restrictions. In particular, an injection-molding method, a compression-molding method and an injection compression-molding method are preferred. The resulting molded article can widely be used in various uses extending from small-sized to large-sized articles. In particular, it can suitably be used in uses for medium-sized to large-sized molded articles for automobiles.

EXAMPLES

The present invention shall more specifically be explained below with reference to examples and comparative examples, but the present invention shall not be restricted by these examples.

Measuring Method of Resin
(1) Isotactic Pentad Ratio
Measured by means of $^{13}$C-NMR based on Macromolecules 8, 687 (1975).
(2) MFR
Measured based on a test condition 14 of JIS-K7210.
(3) Mw/Mn (Q Value)
The sample was dissolved in orthodichloro-benzene of 135° C. and measured by means of a GPC (gel permeation chromatography) apparatus (model 150C, manufactured by Waters Co., Ltd., column used: TSK GEL GMH6-HT).

Evaluation Method of Molded Article
(1) Flexural Strength
A test piece of 10 mm×10 mm×3 mm was cut out from the molded article in a flow direction of the resin and a direction perpendicular to the flow direction by means of a milling machine to measure a flexural strength based on JIS K-7203.
(2) Puncture Impact
A puncture impact test based on ASTM D3763 was carried out. A plate of 50 mm×50 mm was cut out from the molded article to determine a breaking energy value by means of a Dynatap impact tester manufactured by General Research Co., Ltd.

Example 1

A glass roving having an average fiber diameter of 17 μm and a tex yarn number count of 2310 g/km was introduced into an impregnating bath heated at 280° C. On the other hand, fed into the above impregnating bath was a molten substance of a modified propylene homopolymer [modified with maleic anhydride, P value: 96.5%, crystal melting point (measured by DSC): 164° C., MFR: 130 g/10 min, Q value: 2.9]. The glass roving was impregnated with the above modified propylene homopolymer and then pultruded through a round nozzle having a diameter of 2.7 mm. It was cooled down and then cut to a length of 10 mm to obtain a long fiber-reinforced polypropylene resin composition pellet having a glass fiber content of 40% by weight.

The pellet thus obtained was charged into an injection-molding machine set at a cylinder temperature of 250° C. and molded into a molded article of 300 mm×600 mm×3 mm (center direct gate). A test piece for determining a flexural strength and a puncture impact was cut out from the resulting plate and used for evaluating the respective items to find that all were good. The results thereof are shown in Table 1.

Examples 2 to 4

A long fiber-reinforced polypropylene resin composition was produced, molded and evaluate in the same manners as in Example 1, except that maleic anhydride-modified propylene homopolymers described in Table 1 were used as the modified propylene homopolymer. As shown in table 1, the results were good.

Comparative Example 1

A long fiber-reinforced polypropylene resin composition was produced, molded and evaluate in the same manners as in Example 1, except that a maleic anhydride-modified propylene homopolymer having a P value of 95.1% (the others are described in Table 1) was used as the modified propylene homopolymer to find that particularly the flexural strength in a perpendicular direction and the puncture impact were unsatisfactory.

Comparative Example 2

A long fiber-reinforced polypropylene resin composition was produced, molded and evaluate in the same manners as in Example 1, except that a maleic anhydride-modified propylene homopolymer having a P value of 96.7%, a crystal melting point of 164° C., an MFR of 45 g/10 min and a Q value of 3.9 was used as the modified propylene homopolymer. The modified propylene homopolymer had an MFR and a Q value each falling outside the scope of the present invention, and therefore particularly the flexural strength in a perpendicular direction and the puncture impact were unsatisfactory.

Comparative Example 3

A long fiber-reinforced polypropylene resin composition was produced and evaluate in the same manners as in Example 1, except that fed into the impregnating bath was a molten and kneaded substance of 50% by weight of a modified propylene homopolymer [modified with maleic anhydride, P value: 96.5%, crystal melting point (measured by DSC): 164° C., MFR: 130 g/10 min, Q value: 2.9] as the modified propylene homopolymer and 50% by weight of a propylene homopolymer which was not modified with maleic anhydride [P value: 96.6%, crystal melting point (measured by DSC): 164° C., MER: 140 g/10 min, Q value: 2.8]. The modified propylene homopolymer was not used as the matrix polymer in the whole amount, and therefore particularly the flexural strength in a perpendicular direction and the puncture impact were unsatisfactory.

Comparative Example 4

A long fiber-reinforced polypropylene resin composition was produced, molded and evaluate in the same manners as in Example 1, except that fed into the impregnating bath was a molten and kneaded substance of 50% by weight of a modified propylene homopolymer [modified with maleic anhydride, P value: 96.5%, crystal melting point (measured by DSC): 164° C., MFR: 130 g/10 min, Q value: 2.9] and 50% by weight of a propylene homopolymer which was not blended with maleic anhydride and an organic peroxide and which had a high fluidity [P value: 96.7%, crystal melting point (measured by DSC): 164° C., MFR: 160 g/10 min, Q value: 5.4]. The modified propylene homopolymer was not used as the matrix polymer in the whole amount, and in addition thereto, the propylene homopolymer which was molten and kneaded with the above modified propylene homopolymer had a Q value falling outside the scope of the present invention, so that particularly the flexural strength in a perpendicular direction and the puncture impact were unsatisfactory.

Comparative Example 5

An extruding machine having a middle feeding port was used to feed a modified propylene homopolymer [modified with maleic anhydride, P value: 96.5%, crystal melting point (measured by DSC): 164° C., MFR: 130 g/10 min, Q value: 2.9] from an ordinary first feeding port and a chopped glass strand having an average fiber diameter of 13 g and a chop length of 3 mm from a second feeding port in the middle, and they were kneaded and then pelletized. The short fiber-reinforced polypropylene resin composition thus obtained was molded and evaluate in the same manners as in Example 1 to find that the mechanical strength and the puncture impact were unsatisfactory.

Comparative Example 6

A short fiber-reinforced polypropylene resin composition was produced, molded and evaluate in the same manners as in Comparative Example 5, except that a maleic anhydride-modified propylene homopolymer having a P value of 95.1% (the others are described in Table 1) was used as the modified propylene homopolymer to find that the mechanical strength and the puncture impact were unsatisfactory as was the case with Comparative Example 5.

Comparative Example 7

A short fiber-reinforced polypropylene resin composition was produced, molded and evaluate in the same manners as in Comparative Example 5, except that fed from the first feeding port was a mixture of 50% by weight of a modified propylene homopolymer [modified with maleic anhydride, P value: 96.5%, crystal melting point (measured by DSC): 164° C., MFR: 130 g/10 min, Q value: 2.9] and 50% by weight of a propylene homopolymer which was not blended with maleic anhydride and an organic peroxide and which had a high fluidity [P value: 96.7% crystal melting point (measured by DSC): 164° C., MFR: 160 g/10 min, Q value: 5.4]. The mechanical strength and the puncture impact were unsatisfactory as was the case with Comparative Example 5.

Example 5

A long fiber-reinforced polypropylene resin composition was produced in the same manner as in Example 1, except that the glass roving was pultruded through a round nozzle having a diameter of 2.0 mm. It had a glass fiber content of 60% by weight.

Dry-blended were 50% by weight of the long fiber-reinforced polypropylene resin composition described above and 50% by weight of a propylene homopolymer having a P value of 96.8% and an MFR of 70 g/10 min so that the glass fibers accounted for 30% by weight in the final composition, and the blended matter was molded and evaluated in the same manners as in Example 1 to find that the results thereof were good as shown in Table 1.

Example 6

A long fiber-reinforced polypropylene resin composition was produced in the same manner as in Example 1, except that the glass roving was pultruded through a round nozzle having a diameter of 2.0 mm. It had a glass fiber content of 60% by weight.

Dry-blended were 50% by weight of the long fiber-reinforced polypropylene resin composition described above and 50% by weight of a crystalline propylene-ethylene copolymer having a P value of 96.5% in a propylene homopolymer part, an ethylene content of 6.8% by weight in the crystalline propylene-ethylene copolymer and an MFR of 50 g/10 min so that the glass fibers accounted for 30% by weight in the final composition, and the blended matter was molded and evaluated in the same manners as in Example 1 to find that the results thereof were good as shown in Table 1.

TABLE 1

| | | | | Example | | | | Comparative Example | | |
|---|---|---|---|---|---|---|---|---|---|---|
| | | | | 1 | 2 | 3 | 4 | 1 | 2 | 3 |
| Matrix polymer (A1) | Modified propylene homopolymer | P value | % | 96.5 | 96.6 | 96.4 | 97.8 | 95.1 | 96.7 | 96.5 |
| | | MFR | g/10 min | 130 | 90 | 240 | 150 | 130 | 45 | 130 |
| | | Q value | — | 2.9 | 3.2 | 2.7 | 2.8 | 2.6 | 3.9 | 2.9 |
| | | Blending amount in (A1) | wt % | 100 | 100 | 100 | 100 | 100 | 100 | 50 |

TABLE 1-continued

|  |  |  |  |  |  |  |  |  |  |  |
|---|---|---|---|---|---|---|---|---|---|---|
|  | Other propylene polymer | P value | % | — | — | — | — | — | — | 96.6 |
|  |  | MFR | g/10 min | — | — | — | — | — | — | 140 |
|  |  | Q value | — | — | — | — | — | — | — | 2.8 |
|  |  | Blending amount in (A1) | wt % | — | — | — | — | — | — | 50 |
| Glass fiber (A2) | Kind |  | — | Long fiber | Long fiber | Long fiber | Long fiber | Long fiber | Long fiber | Long fiber |
|  | Glass fiber content based on (A) |  | wt % | 40 | 40 | 40 | 40 | 40 | 40 | 40 |
| Blending proportion |  | (A) | wt % | 100 | 100 | 100 | 100 | 100 | 100 | 100 |
|  |  | (B) | wt % | — | — | — | — | — | — | — |
| Final glass fiber content |  |  | wt % | 40 | 40 | 40 | 40 | 40 | 40 | 40 |
| Evaluation | Flexural strength | Flow direction | MPa | 128 | 125 | 130 | 129 | 114 | 103 | 117 |
|  |  | Perpendicular direction | MPa | 109 | 104 | 105 | 111 | 79 | 70 | 83 |
|  | Punching impact | Breaking energy | J | 18.9 | 17.5 | 16.8 | 19.6 | 13.3 | 11.2 | 14.0 |

|  |  |  |  | Comparative Example | | | | Example | |
|---|---|---|---|---|---|---|---|---|---|
|  |  |  |  | 4 | 5 | 6 | 7 | 5 | 6 |
| Matrix polymer (A1) | Modified propylene homopolymer | P value | % | 96.5 | 96.5 | 95.1 | 96.5 | 96.5 | 96.5 |
|  |  | MFR | g/10 min | 130 | 130 | 130 | 130 | 130 | 130 |
|  |  | Q value | — | 2.9 | 2.9 | 2.6 | 2.9 | 2.9 | 2.9 |
|  |  | Blending amount in (A1) | wt % | 50 | 100 | 100 | 50 | 100 | 100 |
|  | Other propylene polymer | P value | % | 96.7 | — | — | 96.7 | — | — |
|  |  | MFR | g/10 min | 160 | — | — | 160 | — | — |
|  |  | Q value | — | 5.4 | — | — | 5.4 | — | — |
|  |  | Blending amount in (A1) | wt % | 50 | — | — | 50 | — | — |
| Glass fiber (A2) | Kind |  | — | Long fiber | Short fiber | Short fiber | Short fiber | Long fiber | Long fiber |
|  | Glass fiber content based on (A) |  | wt % | 40 | 40 | 40 | 40 | 60 | 60 |
| Blending proportion |  | (A) | wt % | 100 | 100 | 100 | 100 | 50 | 50 |
|  |  | (B) | wt % | — | — | — | — | 50 | 50 |
| Final glass fiber content |  |  | wt % | 40 | 40 | 40 | 40 | 30 | 30 |
| Evaluation | Flexural strength | Flow direction | MPa | 105 | 98 | 95 | 97 | 93 | 79 |
|  |  | Perpendicular direction | MPa | 68 | 61 | 60 | 64 | 80 | 67 |
|  | Punching Impact | Breaking energy | J | 10.5 | 5.6 | 4.9 | 5.6 | 10.5 | 15.1 |

Effects of the Invention

The long fiber-reinforced polypropylene resin composition of the present invention is excellent in a mechanical strength and an impact resistance as well in uses for medium-sized to large-sized molded articles by using a specific modified propylene homopolymer as a matrix polymer in the whole amount. In particular, the mechanical strength in a direction perpendicular to a flow direction of the resin is improved, and therefore an anisotropy in a strength of the molded article is small. This makes it possible to widely use the resin composition for various uses extending from small-sized to large-sized molded articles. In particular, it can suitably be used for uses in medium-sized to large-sized molded articles for automobiles.

What is claimed is:

1. A long fiber-reinforced polypropylene resin composition (A) comprising 35 to 75% by weight of a matrix polymer comprising a modified propylene homopolymer with an unsaturated carboxylic acid or an anhydride thereof and which has an isotactic pentad ratio (P value) of 96% or more, a melt flow rate (230°C., 21.18N) of 80 g/10 mm or more and Mw/Mn (Q value) of 3.5 or less and 25 to 65% by weight of a glass long fiber (A2) having a length of 2 to 50 mm.

2. A long fiber-reinforced polypropylene resin composition prepared by compounding the long fiber-reinforced polypropylene resin composition (A) as described in claim 1 and a propylene homopolymer and/or propylene base block copolymer (B).

3. A molded article obtained by molding the long fiber-reinforced polypropylene resin composition (A) as described in claim 1.

4. A molded article obtained by molding the long fiber-reinforced polypropylene resin composition (A) as described in claim 2.

* * * * *